US009586270B2

(12) United States Patent
Zielonka et al.

(10) Patent No.: US 9,586,270 B2
(45) Date of Patent: Mar. 7, 2017

(54) COATED HOLE CUTTER

(75) Inventors: Robert Richard Zielonka, Enfield, CT (US); Joseph H. DeSantis, Ware, MA (US); Christopher F. Fitzgerald, Belchertown, MA (US); Peter Weremchuk, Simsbury, CT (US)

(73) Assignee: IRWIN INDUSTRIAL TOOL COMPANY, Huntersville, NC (US)

( * ) Notice: Subject to any disclaimer, the term of this patent is extended or adjusted under 35 U.S.C. 154(b) by 1232 days.

(21) Appl. No.: 12/687,052

(22) Filed: Jan. 13, 2010

(65) Prior Publication Data
US 2011/0170972 A1   Jul. 14, 2011

(51) Int. Cl.
*B23B 51/04* (2006.01)

(52) U.S. Cl.
CPC ...... *B23B 51/0406* (2013.01); *B23B 2228/10* (2013.01); *B23B 2270/36* (2013.01); *Y10T 408/895* (2015.01); *Y10T 408/8957* (2015.01)

(58) Field of Classification Search
CPC ............ B23B 51/0406; B23B 2228/10; B23B 2270/36; Y10T 408/8957
USPC .... 408/204, 206, 144, 703, 205, 207, 203.5; D15/139 D, 139, 138; D8/16, 19, 20, 70
See application file for complete search history.

(56) References Cited

U.S. PATENT DOCUMENTS

| | | | |
|---|---|---|---|
| D44,561 S | 8/1913 | Gouck | |
| 1,194,503 A | 8/1916 | Jawoisch | |
| 1,564,105 A | 12/1925 | Ouellet | |
| 1,713,972 A | 5/1929 | Lufkin | |
| 1,984,839 A * | 12/1934 | Murray | G09F 3/00 116/200 |
| D139,299 S | 10/1944 | Walters | |
| D160,574 S | 10/1950 | Carlson | |
| 2,817,899 A | 12/1957 | Wheeler | |
| 2,947,206 A | 8/1960 | Flanagan | |
| 3,220,449 A | 11/1965 | Franklin | |
| 3,221,709 A | 12/1965 | Montemayer | |

(Continued)

FOREIGN PATENT DOCUMENTS

| | | |
|---|---|---|
| CN | 201086152 Y | 7/2008 |
| CN | 101583453 A | 11/2009 |

(Continued)

OTHER PUBLICATIONS

*What is the Difference Between Paint and Printing Ink?*, Capex Corporation, Ft. Lauderdale, Florida, Dec. 2009.

(Continued)

*Primary Examiner* — Eric A Gates
*Assistant Examiner* — Paul M Janeski
(74) *Attorney, Agent, or Firm* — Sutherland Asbill & Brennan LLP

(57) ABSTRACT

A coated hole cutter including an ink-based colored coating applied only to the external surface of the cylindrical blade body of the hole cutter, but not to the surfaces of a circumferentially-extending cutting edge or to the interior surface of the blade body. The ink-based color coating is an ultraviolet activated ink that cures when the coating is exposed to a specific ultraviolet light intensity and wavelength. At least the surfaces of the cutting edge and the internal surface of the blade body, which do not include the coating, have a steam tempered oxide finish that imparts a color that contrasts with the color imparted by the coating.

33 Claims, 4 Drawing Sheets

(56) References Cited

U.S. PATENT DOCUMENTS

| | | | |
|---|---|---|---|
| 3,243,924 A * | 4/1966 | Peters | 451/488 |
| D204,877 S | 5/1966 | West | |
| 3,593,419 A | 7/1971 | Hula | |
| 3,804,238 A | 4/1974 | Howard | |
| 3,929,050 A | 12/1975 | Salzwedel | |
| 4,072,441 A * | 2/1978 | LaPointe | 408/204 |
| 4,089,112 A | 5/1978 | Richards | |
| 4,180,909 A | 1/1980 | Lind | |
| D264,800 S | 6/1982 | Osada | |
| D266,735 S | 11/1982 | Hahn | |
| 4,408,935 A | 10/1983 | Miyanaga | |
| 4,541,758 A | 9/1985 | Frank et al. | |
| D281,979 S | 12/1985 | Meier | |
| D282,369 S | 1/1986 | De Villiers | |
| 4,595,321 A | 6/1986 | Van Dalen | |
| 4,631,829 A | 12/1986 | Schmidt et al. | |
| 4,651,425 A | 3/1987 | Livian | |
| 4,660,284 A | 4/1987 | Decarolis | |
| 4,757,612 A | 7/1988 | Peyrot | |
| 4,760,643 A | 8/1988 | Juma | |
| D300,897 S | 5/1989 | Hagberg et al. | |
| D303,118 S | 8/1989 | Cox | |
| 4,891,884 A | 1/1990 | Torbet | |
| 4,904,130 A * | 2/1990 | Gorman | 408/16 |
| 4,982,627 A * | 1/1991 | Johnson | 81/121.1 |
| 5,082,403 A | 1/1992 | Sutton et al. | |
| D324,326 S | 3/1992 | Lu | |
| 5,092,716 A | 3/1992 | Omi | |
| 5,137,098 A * | 8/1992 | Raffaelli | 175/403 |
| 5,186,739 A * | 2/1993 | Isobe et al. | 75/238 |
| 5,205,685 A | 4/1993 | Herbert | |
| D342,270 S | 12/1993 | Kwang | |
| 5,351,595 A | 10/1994 | Johnston | |
| 5,360,300 A | 11/1994 | Sullivan | |
| D359,967 S | 7/1995 | Eichenberg et al. | |
| 5,445,680 A * | 8/1995 | Hamilton | 134/26 |
| 5,466,099 A * | 11/1995 | Sullivan et al. | 408/206 |
| D368,633 S | 4/1996 | Nakayama | |
| 5,597,272 A * | 1/1997 | Moriguchi et al. | 407/119 |
| D382,885 S | 8/1997 | Deiner et al. | |
| 5,676,501 A * | 10/1997 | Peetz et al. | 408/204 |
| D388,318 S | 12/1997 | Achterberg et al. | |
| D391,974 S | 3/1998 | Brutscher | |
| 5,785,522 A * | 7/1998 | Bergstrom et al. | 433/72 |
| 5,803,678 A | 9/1998 | Korb et al. | |
| 5,806,189 A | 9/1998 | Bailey | |
| D401,822 S | 12/1998 | Pearlman | |
| D406,220 S | 3/1999 | Schmidt | |
| 5,904,454 A | 5/1999 | Washer | |
| 5,906,050 A | 5/1999 | Gilbert | |
| 5,909,930 A | 6/1999 | Ragland | |
| D412,654 S | 8/1999 | Gilbert et al. | |
| D412,655 S | 8/1999 | Gilbert et al. | |
| D412,822 S | 8/1999 | Gilbert et al. | |
| D422,185 S | 4/2000 | Gold | |
| D423,038 S | 4/2000 | Shimoyama et al. | |
| 6,120,220 A | 9/2000 | Speare | |
| D438,219 S | 2/2001 | Brutscher | |
| 6,227,188 B1 | 5/2001 | Tankala et al. | |
| D443,495 S | 6/2001 | Wang | |
| 6,257,098 B1 * | 7/2001 | Cirone | 81/119 |
| D450,552 S | 11/2001 | Mason | |
| 6,315,504 B1 * | 11/2001 | Sekiguchi et al. | 408/144 |
| D455,057 S | 4/2002 | Medhurst | |
| 6,363,614 B1 | 4/2002 | Umstead et al. | |
| D457,269 S | 5/2002 | Arey | |
| D459,172 S | 6/2002 | Bissell | |
| 6,438,849 B1 | 8/2002 | Wonderley | |
| D462,241 S | 9/2002 | Lothe | |
| 6,443,674 B1 * | 9/2002 | Jaconi | 408/1 R |
| 6,578,268 B2 | 6/2003 | Hawketts | |
| D478,106 S | 8/2003 | Morton et al. | |
| D478,339 S | 8/2003 | Morton et al. | |
| D478,919 S | 8/2003 | Morton et al. | |
| 6,708,410 B2 | 3/2004 | Okada | |
| 6,718,640 B1 | 4/2004 | John | |
| 6,719,422 B2 | 4/2004 | Wu et al. | |
| 6,857,831 B2 | 2/2005 | Davis | |
| 6,866,889 B1 * | 3/2005 | Lill et al. | 427/248.1 |
| D508,389 S | 8/2005 | Polk | |
| D517,894 S | 3/2006 | Kondo et al. | |
| 7,010,998 B2 * | 3/2006 | Ying-Hao | 81/121.1 |
| 7,014,895 B1 * | 3/2006 | Grotefend et al. | 428/32.81 |
| 7,021,872 B2 * | 4/2006 | Hauptmann et al. | 408/16 |
| 7,028,588 B2 * | 4/2006 | Shih | 81/121.1 |
| 7,140,451 B2 | 11/2006 | Yoshimizu et al. | |
| D539,616 S | 4/2007 | Taylor et al. | |
| 7,258,513 B2 | 8/2007 | Gertner | |
| D551,269 S * | 9/2007 | Burke, III | D15/139 |
| 7,275,898 B2 | 10/2007 | Malagnino et al. | |
| D559,044 S | 1/2008 | Ono | |
| D562,651 S | 2/2008 | Harkey | |
| D565,382 S | 4/2008 | Watanabe | |
| 7,553,114 B2 | 6/2009 | Oknestam et al. | |
| D602,510 S * | 10/2009 | Harpaz | D15/139 |
| 7,658,576 B1 * | 2/2010 | Buzdum et al. | 408/204 |
| 7,818,867 B1 * | 10/2010 | Capstran et al. | 29/458 |
| D627,806 S * | 11/2010 | Khina | D15/139 |
| 7,922,428 B2 * | 4/2011 | Weerasinghe | 408/144 |
| 8,080,323 B2 * | 12/2011 | Ban et al. | 428/698 |
| 8,455,609 B2 * | 6/2013 | Ricci et al. | 528/61 |
| 2001/0010833 A1 * | 8/2001 | Ray | G09F 3/00 427/180 |
| 2002/0037201 A1 | 3/2002 | Despres | |
| 2002/0121023 A1 | 9/2002 | Kocher et al. | |
| 2002/0122703 A1 | 9/2002 | Czyzewski et al. | |
| 2003/0084575 A1 | 5/2003 | Chen | |
| 2003/0088985 A1 | 5/2003 | Huang | |
| 2003/0094078 A1 | 5/2003 | Clanton | |
| 2003/0200661 A1 | 10/2003 | Okada | |
| 2004/0129125 A1 | 7/2004 | Colquhoun | |
| 2005/0022390 A1 | 2/2005 | Whitemiller et al. | |
| 2005/0050734 A1 | 3/2005 | Kesinger | |
| 2005/0172416 A1 | 8/2005 | Feliciano | |
| 2005/0193566 A1 | 9/2005 | Brown et al. | |
| 2005/0262702 A1 | 12/2005 | Hawthorn | |
| 2007/0227012 A1 | 10/2007 | Constantine et al. | |
| 2007/0245574 A1 | 10/2007 | Green | |
| 2008/0107882 A1 * | 5/2008 | Littecke et al. | 428/215 |
| 2008/0131223 A1 | 6/2008 | Jauch | |
| 2009/0106909 A1 | 4/2009 | Tyers | |

FOREIGN PATENT DOCUMENTS

| | | | |
|---|---|---|---|
| EP | 0375526 A1 | 6/1990 | |
| FR | 2710570 A1 | 4/1995 | |
| JP | S55152182 A | 11/1980 | |
| JP | H02136278 A | 5/1990 | |

OTHER PUBLICATIONS

*Printing, Marking, and Decorating of Plastics*, R. Coningsby, Apex Machine Compant, 1998.

*Statement of Compliance*, Capex Corporation, Ft. Lauderdale, Florida, Oct. 2009.

*Bi-Metal Hole Saw 825-2 Package*, Greenlee Textron Inc., Rockford, Illinois, 2003.

William Henry, B04 Pikatti Knife, 2005, Available at http://www.onlyfineknives.com/knife.php?k=224451, Accessed Nov. 6, 2008.

Flexible Bi-Metal Hacksaw Blade H888, 2008, Available at http://www.alibaba.com/product-gs/210815366/Flexible_bi_metal_hacksaw_blade_H888.html, Accessed Nov. 6, 2008.

International Search Report for International Application No. PCT/US2011/021214 mailed Mar. 9, 2011.

Written Opinion of International Searching Authority for International Application PCT/US2011/021214 mailed Mar. 9, 2011.

\* cited by examiner

COATED HOLE CUTTER

FIELD OF THE INVENTION

The present invention relates to hole cutters, and more particularly, to hole cutters with coatings thereon.

BACKGROUND INFORMATION

A typical prior art hole cutter, or hole saw, includes a cylindrical blade body defining a plurality of saw teeth on the cutting edge of the blade body, and a plurality of apertures that are angularly spaced relative to each other about the blade body within an intermediate portion of the blade body. The apertures may define any of a variety of different configurations to facilitate inserting a tool into the apertures, such as a screw driver, to remove circular work piece slugs from within the interior of the blade body that result from cutting work pieces. The hole cutters are often coated, such as with paint, to protect the cutters against rust and/or for decorative or advertising purposes, such as with a particular manufacturer's distinctive color(s), trade dress, trademarks and/or logos.

One of the drawbacks encountered with some prior art hole cutters is that the coating is applied to all surfaces of the hole cutters, including all exterior and interior surfaces of the hole cutters, and therefore a relatively large amount of coating material is needed to coat the cutters. Since coating materials can be costly, these coating techniques can increase the manufacturing costs and, ultimately, increase the costs of the hole cutters to consumers.

Another drawback encountered with prior art hole cutters is that the interfaces of the blades bodies and work pieces, such at the cutting edges and the interior and exterior surfaces of the blade bodies adjacent to the cutting edges, can become heated due to the frictional forces between the rotating blade bodies and work pieces. The thermal energy created by such frictional forces gives rise to substantial heat that can soften or otherwise turn the coatings on these areas soft or gooey. Soft or gooey coatings act to increase frictional forces at the interfaces, and thereby reduce overall cutting speed and degrade the cutting efficiency of the hole cutters. A soft or gooey coating on the interior of a hole cutter can interfere with removal of a slug located therein, as a soft or gooey coating can stick to a slug and increase the frictional forces between the slug and the interior surface of the hole cutter to prevent the slug from being pushed or pried out of the interior of the cutter. Still further, the soft or gooey coatings can transfer from the hole cutters to work pieces, thereby staining, marking or otherwise tarnishing the work pieces.

Another drawback encountered with some prior art hole cutters is that they are unable to evacuate the volume of chips and/or dust created during cutting. The rate at which the chips and/or dust are generated during cutting can rapidly overcome the ability of some prior art hole cutters to allow for the egress of chips or dust away from the cutting edge, the interior of the bade body and/or other interfaces between the blade bodies and work pieces. The chips and dust that collect at the interfaces of the blade bodies and work pieces can become heated due to frictional forces created between the rotating blade body, collected dust and chips, and work piece. The thermal energy created by such frictional forces gives rise to substantial heat that can turn the coatings on the hole cutters soft or gooey. The soft or gooey coatings tend to trap dust and chips at the interfaces of the hole cutters and work pieces, such as at the cutting edge, and further degrade the cutting efficiency of the hole cutters.

Accordingly, it is an object of the present invention to overcome one or more of the above-described drawbacks and/or disadvantages of the prior art.

SUMMARY OF THE INVENTION

In accordance with a first aspect, the present invention is directed to a hole cutter defining an axis of rotation for cutting a work piece and generating chips upon cutting the work piece. The hole cutter comprises a substantially cylindrical blade body extending about the axis of rotation, a cap located at one end of the blade body, and a cutting edge located at an opposite end of the blade body relative to the cap. The blade body defines substantially cylindrical exterior and interior surfaces, the cap defines exterior and interior surfaces, and the cutting edge defines exterior and interior surfaces. The hole cutter further comprises a non-metallic coating defining a colored band extending axially and annularly throughout a substantial portion of the exterior cylindrical surface of the blade body and axially spaced from the cutting edge a first distance. The exterior surface of the cutting edge defines a metallic finish forming a metallic band extending about the periphery of the blade body at the cutting edge, extending axially between the cutting edge and the non-metallic colored coating band, and contrasting in color with the non-metallic colored coating band. The interior surfaces of the cylindrical blade body and cutting edge also define a metallic finish. The metallic finish maintains the interfaces between the exterior and interior surfaces of the cutting edge, and the interior surface of the blade body, and a work piece, substantially free of any coating that softens and mixes with the chips generated upon cutting the work piece.

In the currently preferred embodiments of the present invention, the non-metallic coating forms a substantially cylindrical band extending throughout a cylindrical portion of the blade body spaced a first distance relative to the cutting edge. In some such embodiments, the cylindrical non-metallic coating band defines a substantially straight edge spaced the first distance relative to the cutting edge. In such embodiments, the cutting edge is defined by a plurality of teeth defining tips and gullets extending between the tips, each gullet defines a depth, and the first distance is greater than the depth of the deepest gullet. The first distance is preferably at least about 1/10 inch greater than the deepest gullet. The first distance also is preferably less than about 1/2 inch greater than the deepest gullet, is more preferably less than about 1/3 inch greater than the deepest gullet, and is more preferably less than about 1/4 inch greater than the deepest gullet.

In the currently preferred embodiments of the present invention, the non-metallic colored coating extends throughout substantially the entire cylindrical band. Also in the currently preferred embodiments, the non-metallic colored coating band is spaced inwardly from an axial end surface of the cap, and the cap defines a metallic finish. In some such embodiments, the non-metallic colored coating band is spaced inwardly from the axial end surface of the cap a second distance that is preferably at least about the same as or greater than the first distance, and is even more preferably about the same as the first distance.

In the currently preferred embodiments of the present invention, the metallic finish is a steam tempered oxide finish. Preferably, the oxide finish is a film of iron oxide. In other embodiments of the present invention, the metallic finish on the cutting edge is defined by a metallic coating. In some such embodiments, the metallic finish also underlies the non-metallic coating. In some such embodiments, the metallic coating is located on both the exterior and interior surfaces of the cutting edge. In some embodiments, the metallic coating is a PVD coating. In some such embodiments, the PVD coating is titanium nitride, aluminum titanium nitride, and/or a combination of titanium nitride and aluminum titanium nitride.

In the currently preferred embodiments of the present invention, the non-metallic colored coating band covers at least about 75% of the external surface area of the cylindrical blade body, preferably covers at least about 85% of the external surface area of the cylindrical blade body, and more preferably covers at least about 90% of the external surface area of the cylindrical blade body.

In the currently preferred embodiments of the present invention, the non-metallic colored coating is defined by an ink or paint. In some such embodiments, the non-metallic colored coating is defined by a dye, an ink containing dye, a photo, light or radiation curable ink, a heat or hot air drying ink, and/or a solvent based ink. In some such currently preferred embodiments, the non-metallic colored coating is a UV curable ink. Preferably, the non-metallic colored coating is a heat resistant coating that does not soften when subjected to frictional forces and/or heat encountered during cutting. In the currently preferred embodiments of the present invention, the colored coating band defines a label including thereon a trademark, logo, manufacturer identification, part number and/or any of numerous other types of indicia or information that may be desired.

In accordance with another aspect, the present invention is directed to a hole cutter defining an axis of rotation for cutting a work piece and generating chips upon cutting the work piece. The hole cutter comprises a substantially cylindrical blade body extending about the axis of rotation, a cap located at one end of the blade body, and a cutting edge located at an opposite end of the blade body relative to the cap. The blade body defines substantially cylindrical exterior and interior surfaces, the cap defines exterior and interior surfaces, and the cutting edge defines exterior and interior surfaces. The hole cutter comprises non-metallic means axially spaced from the cutting edge and extending axially and annularly throughout a substantial portion of the exterior cylindrical surface of the blade body for decorating the hole cutter and receiving thereon a trademark, logo, manufacturer identification and/or part number. The hole cutter further comprises metallic means contrasting in color with the non-metallic means, extending about the periphery of the blade body at the exterior and interior surfaces of the cutting edge, extending axially between the cutting edge and the non-metallic means, and extending axially and annularly throughout a substantial portion of the interior cylindrical surface of the blade body, for maintaining the interfaces between the exterior and interior surfaces of the cutting edge, and the interior surface of the blade body, and a work piece, substantially free of any coating that would soften and mix with the chips generated upon cutting the work piece.

In the currently preferred embodiments of the present invention, the non-metallic means is a non-metallic coating and the metallic means is a metallic finish. In some such embodiments, the non-metallic coating is a UV curable ink, and the metallic finish is a steam tempered, iron oxide finish.

One advantage of the hole cutters of the present invention is that because the coating is only applied to the external surface of the blade body, but not to the cutting edge or to the interior of the hole cutter, there is no opportunity for a coating on these surfaces to become heated and mixed with the chips or dust, or to otherwise interfere with the cutting efficiency of the hole cutter. Another advantage of some currently preferred embodiments of the hole cutters of the present invention is that because the coating is an ink as opposed to a paint or other typical prior art coating, even if the coating were to become excessively heated (which is not likely as the coating is not applied at the high heat interfaces with the work piece), it does not become soft or gooey and therefore does not reduce the cutting efficiency of the hole cutter. Yet another advantage of the hole cutters of the present invention is that since the coating is applied to the external surface of the cylindrical blade body, the coating allows the hole cutter to bear a desired color, such as the manufacturer's distinctive color or trade dress, and to bear trademarks, logos, information identifying the manufacturer or seller, part numbers, and/or other desired information. Yet another advantage of the hole cutters of the present invention is that the appearance of the dark colored cutting edge against the contrasting color of the coating on the blade body provides an aesthetically desirable appearance. A further advantage of the currently preferred embodiments of the present invention is that the non-metallic colored coating is applied only in a band to the exterior surface of the cylindrical blade body, and therefore less colored coating may be required and/or the application of the coating to the cutting edge can be less expensive in comparison to prior art hole cutters that have coatings, such as paints, applied to the external and internal surfaces of the hole cutter and/or to all surfaces of the hole cutter.

Other objects and advantages of the hole cutters of the present invention, and/or of the currently preferred embodiments thereof, will become more readily apparent in view of the following detailed description of the currently preferred embodiments and the accompanying drawings.

DETAILED DESCRIPTION OF PREFERRED EMBODIMENTS

Figure 1:
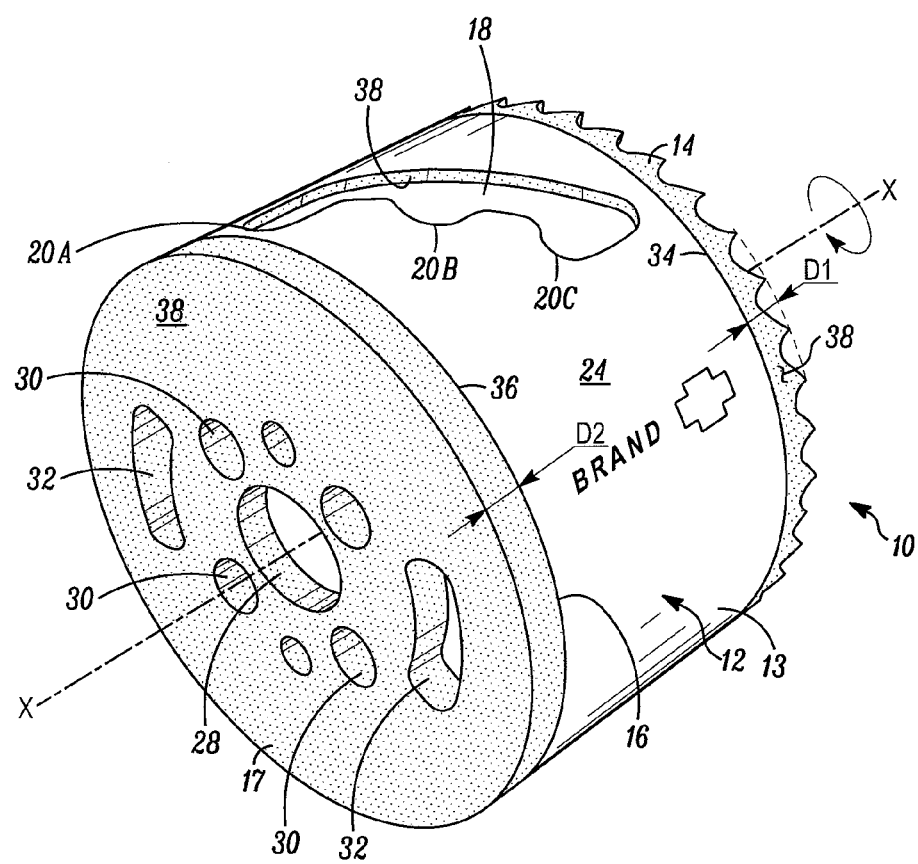
FIG. 1 is a perspective view of a hole cutter embodying the present invention.
Figure 2:
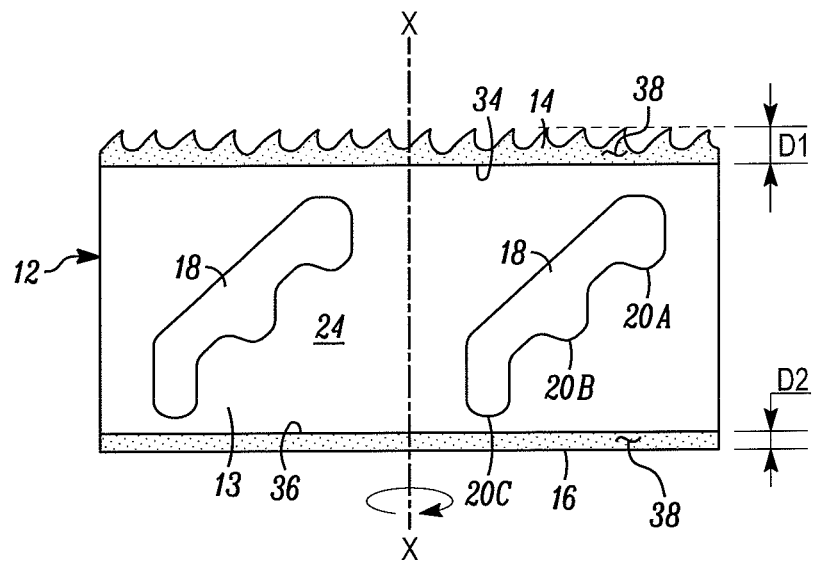
FIG. 2 is a side elevational view of the blade body of the hole cutter of FIG. 1 prior to being formed into a cylindrical shape.
Figure 3:
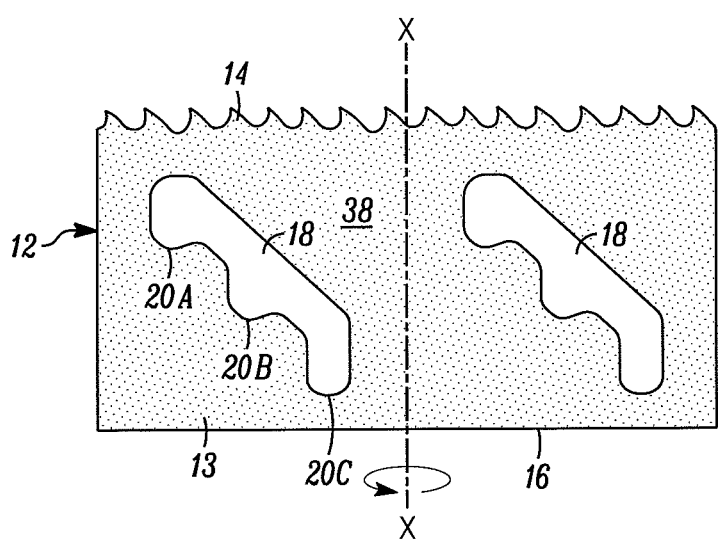
FIG. 3 is an opposite side elevational view of the blade body of the hole cutter of FIG. 1 prior to being formed into a cylindrical shape.

In FIG. 1, a hole cutter embodying the present invention is indicated generally by the reference numeral 10. The term "hole cutter" is used herein to mean a tool that cuts holes in work pieces, such as wood or metal work pieces, and includes without limitation hole saws. The hole cutter 10 includes a blade body 12 defining a side wall 13. The blade body 12 is shown in FIGS. 2 and 3 in its flattened state; however, as shown in FIG. 1, the blade body 12 is rolled or otherwise formed into a substantially cylindrical shape to form the hole cutter 10. As shown in FIG. 1, the side wall 13 extends around an axis of rotation "X" of the hole cutter 10 to define the substantially cylindrical blade body 12. One end of the blade body 12 is provided with a cutting edge 14 oriented substantially perpendicular to the axis of rotation X, and the opposing end of the blade body defines a rim 16. As shown in FIGS. 1 and 3, a cap 17 is fixedly secured, such as by welding, to the rim 16 to enclose the respective end of the hole cutter 10, which is referred to herein as the "non-working" end of the hole cutter. The cap 17 includes a central hub 28 defining a threaded aperture for threadedly engaging an arbor, a plurality of drive pin apertures 30 substantially equally spaced relative to each other about the central hub 28 for engaging the drive pins of the arbor, and a pair of angularly-extending apertures 32 spaced about 180° apart on opposite sides of the hub 28 relative to each other. The angularly-extending apertures 32 are dimensioned and positioned to allow insertion therein of a tool, such as a screw driver, to facilitate work piece slug removal.

As shown in FIGS. 1-3, the circumferential cutting edge 14 is defined by a plurality of cutting teeth with gullets extending between the teeth. The cutting teeth are configured to cut into a work piece when the cutter 10 is applied to a work piece and rotated about the axis of rotation X in a cutting direction. In the currently preferred embodiments, the cutting edge 14 is a bi-metal cutting edge wherein the tips of the teeth are formed by a relatively hard metal, such as tool steel, and the other portions of the teeth and blade body are made of relatively softer steel, such as carbon steel. However, as may be recognized by those of ordinary skill in the pertinent art based on the teachings herein, the cutting edge 14 may be defined by any of numerous different tooth forms or other cutting edge forms that are currently known or that later become known. Similarly, although the blade body 12 is shown as being formed from sheet metal that is rolled or otherwise formed into the cylindrical blade body 12 and is, in turn, welded or otherwise attached to the cap 17, the hole cutter 10 may be formed in any of numerous other ways that are currently known, or that later become known. For example, the end cap 17 and side wall 13 may be spun, drawn, molded or otherwise formed in one integral part.

As shown in FIGS. 1-3, the blade body 12 defines two axially-elongated apertures or slots 18 formed through the side wall 13. As can be seen, the two slots 18 are angularly spaced relative to each other on the cylindrical blade body 12. In the illustrated embodiment, the two slots 18 are approximately equally spaced relative to each other, i.e., the two slots are spaced about 180° relative to each other. Each slot 18 is configured to receive therethrough a lever, such as a screw driver, for removal of a work piece slug located within the interior of the blade body 12. As shown in FIGS. 1-3, each slot 18 includes three fulcrums 20A, 20B and 20C axially and angularly spaced relative to each other. The fulcrums 20A, 20B and 20C are defined by recessed radiused edge surfaces of the side wall 13 that are formed on the edge of the respective slot 18 that is adjacent to, or on the side of, the non-working end of the hole cutter 10. The first fulcrum 20A is located adjacent to the cutting edge 14, the second fulcrum 20C is spaced furthest from the cutting edge 14 and located adjacent to the non-working end of the hole cutter and is angularly spaced from the first fulcrum 20A in a direction opposite to the cutting direction, and the third fulcrum 20C is located axially and angularly between the first and second fulcrums 20A and 20C, respectively. As may be recognized by those of ordinary skill in the pertinent art based on the teachings herein, the hole cutters may not define any slots or like apertures, may define a different number of such slots or apertures (e.g., larger diameter hole cutters may define more slots and smaller diameter hole cutters may define a few number of slots), the slots may not define such fulcrums, or may define a different numbers of fulcrums (e.g., a slot may define four fulcrums instead of three).

As shown in FIGS. 1 and 3, a coating 24 is applied to the external surface of the cylindrical blade body 12 of the hole cutter 10. The coating 24 extends angularly about the periphery of the cylindrical blade body 12 and axially between a first boundary 34 adjacent to the working end of the hole cutter 10 and a second boundary 36 adjacent to the non-working end of the hole cutter. As can be seen, the coating 24 is applied only between the first and second boundaries 34 and 36, respectively, but not to the circumferentially-extending cutting edge 14, including the cutting teeth and the gullets therebetween, or to the cap 17. The first boundary 34 of the coating 24 is axially spaced a first distance D1 from the cutting edge 14, and the second boundary 36 is axially spaced a second distance D2 from the axial end surface of the cap 17 or non-working end of the hole cutter 10. The coating 24 is applied to a substantial portion of the external surface of the cylindrical blade body 12, preferably covers at least about 50% of the external surface area of the blade body 12, more preferably covers at least about 75%, more preferably covers at least about 85%, and more preferably covers at least about 90%.

The first distance D1 between the working end boundary 34 of the coating 24 and the cutting edge 14 is within the range of about $\frac{1}{16}$ inch to about $\frac{1}{2}$ inch, is preferably within the range of about $\frac{1}{10}$ inch to about $\frac{1}{3}$ inch, and is more preferably with the range of about $\frac{1}{8}$ inch to about $\frac{1}{4}$ inch. The second distance D2 is preferably at least the same as or even greater than the first distance D1, and is more preferably about equal to the first distance D1. As may be recognized by those of ordinary skill in the pertinent art based on the teachings herein, these dimensions are only exemplary, and any of numerous other dimensions that are currently known, or that later become known, may be employed. For example, if desired, the cap 17 may be coated, and need not define a metallic finish as illustrated in FIG. 1.

In the illustrated embodiment, the distance D1 is measured from a plane extending between the tips of unset teeth. Alternatively, the distance D1 may be measured from the deepest gullet of the cutting edge. However, as may be recognized by those of ordinary skill in the pertinent art based on the teachings herein, this distance, or the distances between other features of the hole cutter 10 and the cutting edge 14, may be measured with respect to any of numerous other reference lines or features that are currently known or used, or that later become known or used.

The coating 24 allows the hole cutter 10 to bear a desired color, such as the distinctive color of a manufacturer's or seller's trade dress, trademarks, logos, part numbers, manufacturer or seller identifying information, and/or any of numerous other information that is currently known or that later becomes known. In the illustrated embodiment, the coating 24 is a contrasting color as compared to the color of the cutting edge 14 or other components of the hole cutter 10 which do not include the coating 24. As shown in FIGS. 1-3, the color of the coating 24 is a relatively light color, such as a shade of white, and the color of the cutting edge 14, interior surfaces of the blade body 12 and/or cap 17, is a relatively dark color, such as a shade of black or grey. Accordingly, the coating 24 provides the advantages of hole cutter coatings in general (e.g., surface protection and/or an attractive or distinctive appearance) but does not interfere with cutting efficiency or slug removal. For example, because the coating 24 is not present at the cutting edge 14, including the cutting teeth and the gullets formed thereby, but, is spaced a first distance D1 away from the cutting edge 14, the coating 24 is not effected by the relatively high temperatures present at the cutting edge during a cutting operation. Similarly, as shown best in FIG. 3, the interior surfaces of the blade body 12, which tend to rub against the slug as the slug is created, do not include the coating 24. As a result, the coating 24 does not become heated at the cutting edge 14 or on the interior surface of the blade body 12 during a cutting operation, and therefore the coating cannot interfere with chip ejection or otherwise cause a reduction in cutting efficiency, and cannot interfere with slug removal.

Another advantage of the currently preferred embodiments of the present invention is that the coating 24 is a non-metallic coating that is heat resistant, and does not become soft or gooey when subjected to heat generating frictional forces during cutting operations, but rather tends to wear by flaking off the external surface of the hole cutter. In the illustrated embodiment, the coating 24 is a cured ultraviolet curable ink, also known as a UV ink. The primary components of the UV ink are pigment and resin. Ultraviolet curing of the UV ink coating 24 is achieved through a process known as photopolymerization, wherein a photochemical reaction, or "curing," replaces the "drying" stage of typical heat/air drying coatings, such as traditional paint-based coatings. The un-cured UV ink contains 100% solids formulations in liquid format and is thus free of solvents. In its liquid non-cured state, the resin of the UV ink coating 24 is made up of liquid monomers, oligomers, and a relatively small amount of photoinitiators. The photoinitiators initiate polymerization (monomers and oligomers join to become a polymer) and almost instantly (within fractions of a second) harden the coating 24 when it is exposed to a specific UV light intensity and wavelength. As the UV ink coating 24 cures through this chemical reaction, there is no loss of film thickness and the entire non-cured UV ink coating 24 initially applied to the external surface of the cylindrical blade body 12 remains thereon after curing. In one embodiment, the UV ink coating 24 is any one of the 84, 85, 87, 89, 90, 92, 93, 94, 95, or 96 Series UV printing inks manufactured by Capex Corporation of Ft. Lauderdale, Fla. USA.

The UV ink coating 24 differs, generally, from a paint-based coating in that the UV coating 24 is not solvent based and does not include drying agents. The UV ink coating 24 further differs from a paint coating in that the un-cured and cured states of the UV ink coating 24 define the same film thicknesses, whereas with paint, the solvents in the paint evaporate and reduce the film thickness up to about 50%. The UV ink coating 24 also differs from traditional paint-based hole cutter coatings in that since the UV ink coating 24 is free of solvents, it does not contain dangerous volatile organic compounds (VOCs) and can be safer to manufacture and apply to the hole cutter 10.

Another advantageous feature of the coating 24 as compared to a traditional hole cutter coating, such as a paint-based coating, is that when the coating 24 is exposed to high temperatures, the coating 24 tends to crack and portions of the coating disengage from the cutter 10 rather than become soft or gooey, i.e., the coating 24 tends to flake off the surfaces to which it is applied rather than become soft or gooey. Yet another advantageous feature of the coating 24 as compared to a traditional hole cutter coating, such as a paint-based coating, is that the coating 24 includes a non-stick or friction-reducing property. The characteristics of the coating that give rise to a reduced coefficient of friction are the surface roughness, hardness and molecular attraction. The cured coating is smooth, hard (as compared to a paint, for example) and has a low molecular attraction to work pieces (i.e., is not "sticky"). As a result, the coating 24 has a lubricating effect that reduces the coefficient of friction of the hole cutter 10 as compared to traditional coatings, such as paint-based coatings, or to uncoated hole cutters. The reduced coefficient of friction results in reduced friction at the interface(s) between the coating 24 and the work piece.

Figure 4:
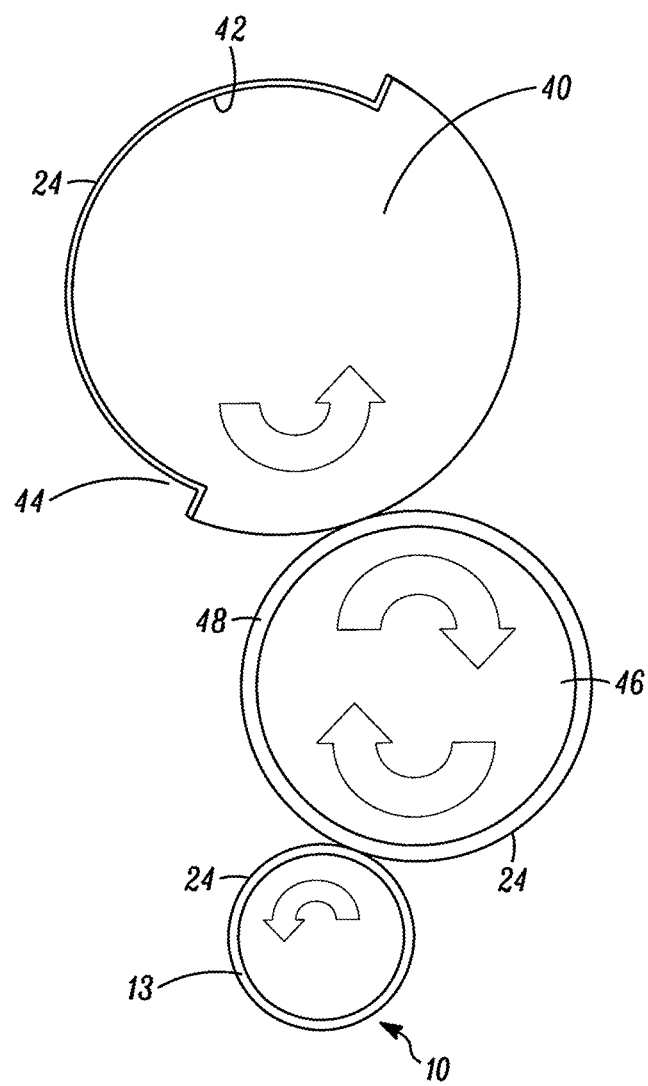
FIG. 4 is a schematic illustration of an apparatus for coating the hole cutter of FIG. 1.

With reference to FIG. 4, in the currently preferred embodiments of the present invention, the coating 24 is applied to the external surface of the cylindrical blade body 12 with a rotary offset printing apparatus and process. A rotatable cliché 40 includes one or more correct reading printing plates 42 on its periphery. The correct reading plate(s) 42 includes one or more depressions 44 which correspond to the desired coating design. In the illustrated embodiment, the non-metallic coating 24 defines a band extending about the periphery of the cylindrical blade body, and therefore the correct reading plate 42 defines a single depression having a circumferential distance approximately equal to the circumference of the respective hole cutter 10. As the cliché 40 with printing plate(s) 42 is rotated, the depression 44 is filled with the coating material, which in the illustrated embodiment is the UV curable ink described above. Upon further rotation of the cliché 40, the depression 44 is brought into contact with a rotating print transfer device 46 including a padded or flexible surface 48, such as a rubber blanket, or a specially compounded elastomeric material, such as silicone. As can be seen, the padded surface 48 of the rotary print transfer device 46 is forced into the depression 44 and thereby picks up the coating material 24 in the desired coating design, e.g., including any information such as part numbers, trademarks, logos, etc. Upon further rotation of the transfer device 46, the padded surface 48 and the un-cured coating material 24 thereon is then placed or moved into contact with a rotating hole cutter 10, such that the cylindrical blade body 12 of the hole cutter 10 aligns with the coating design on the padded surface 48 and the coating material 24 is transferred from the padded surface 48 of the transfer device 46 to the blade body 12. The coating material 24 is then cured by, for example, exposing the coating to the specific ultraviolet light, and the hole cutter 10 is thereby coated. This process is then repeated for the application of the coating to additional hole cutters. Additional coating layers (e.g., to add coated portions in different colors, or to add names, part numbers, trademarks, logos, etc.) can be applied to the hole cutters through the use of multiple printing plates 42 on the cliché 40, a plurality of clichés 40, by performing additional printing processes, or combinations thereof.

As shown in FIGS. 1-3, the components or surface areas of the hole cutter 10 that do not include the coating 24 include a metallic finish, which in the currently preferred embodiments of the present invention, is a steam tempered, dark-colored or black oxide finish 38 (i.e., a metallic finish without any non-metallic coating 24). Specifically, the surfaces of the cutting edge 14 between the tips of the cutting teeth and the first boundary 34 of the coating 24, the non-working portion of the external surface of the blade body 12 extending between the second boundary 36 of the coating 24 and the axial end surface or non-working end of the hole cutter 10, the other surfaces of the cap 17, the side wall edges defining the interior surfaces of the slots 118 (i.e., the slot edges defined by the thickness of the side wall 13), the internal surfaces of the cylindrical blade body 12, the internal surfaces of the cutting edge 14, and the internal surfaces of the cap 17 (i.e., the internal surfaces of the hole cutter 10), include thereon the steam-oxide finish 38.

In a currently preferred embodiment, the steam-oxide finish 38 is a thin, hard, tenacious, well-adhered, blue-black colored film of iron oxide, such as magnetite ($Fe_3O_4$). In the illustrated embodiment, the steam-oxide finish 38 is about 0.0001 inch thick; however, as may be recognized by those of ordinary skill in the pertinent art based on the teachings herein, this thickness is only exemplary, and the metallic finish may take any of numerous different thicknesses or other dimensions or characteristics that are currently known or that later become known. The steam-oxide finish 38 is preferably applied through a tempering operation in which steam is passed over the hole cutter 10 surfaces during a controlled tempering cycle. In one currently preferred embodiment, the steam oxide finish 38 is applied to the surfaces by placing the components or assembled cutters in a furnace and purging the air from the furnace through the introduction of an inert gas, such as nitrogen. The components or assembled cutters are then heated by introducing steam at a temperature within the range of about 600° F. to about 1100° F. into the furnace and soaking the components or assembled cutters for a period of time at a temperature within the range of about 900° F. and about 1100° F. A positive pressure is preferably maintained within the furnace. The steam-oxide finish 38 advantageously decreases the porosity of the material, adds wear resistance, increases corrosion resistance, improves part life, reduces cleaning operations and is environmentally safe. The appearance of the dark colored steam-oxide finish 38 provides an aesthetically desirable appearance, particularly in contrast to the color(s) imparted by the non-metallic coating 24 to the blade body 12.

Figure 5:
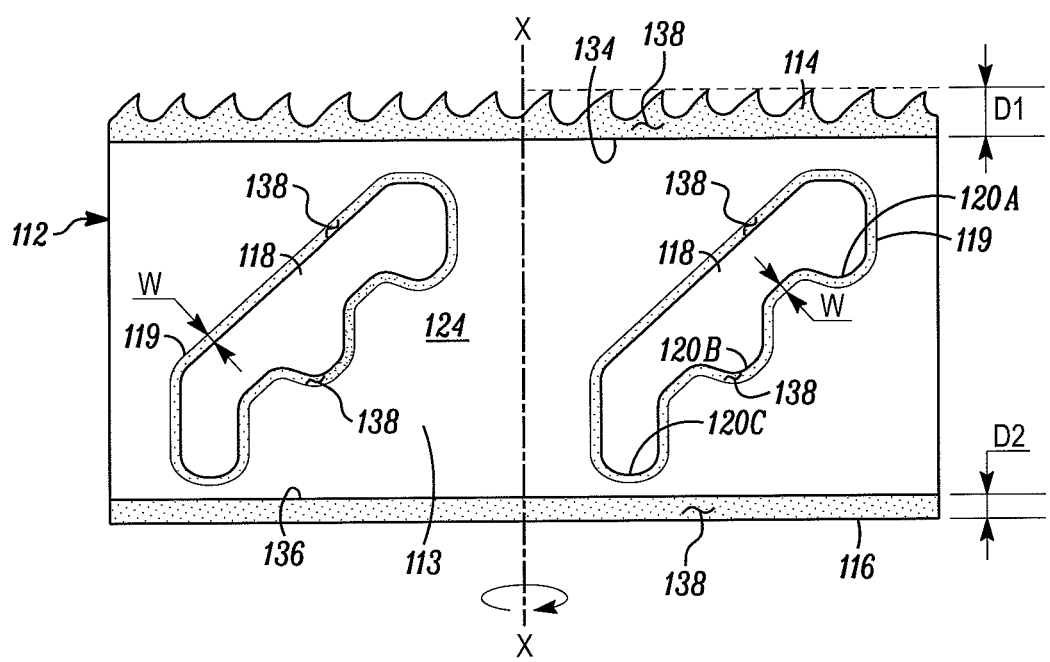
FIG. 5 is a side elevational view of another embodiment of a blade body of the present invention prior to being formed into a cylindrical shape.

In FIG. 5, another embodiment of a blade body of the present invention is indicated generally by the reference numeral 112. The blade body 112 is shown in its flattened state; however, as shown in FIG. 1 with respect to the blade body 12, and as will be recognized by those of ordinary skill in the pertinent art based on the teachings herein, the blade body 112 is rolled or otherwise formed into a substantially cylindrical shape to form a hole cutter. The blade body 112 is substantially the same as the blade body 12 described above in connection with FIGS. 1-3, and therefore like reference numerals preceded by the numeral "1" are used to indicate like elements. The primary difference of the blade body 112 in comparison to the blade body 12 described above is that the external surfaces of the side wall 113 extending along the peripheries of the axially-extending slots 118 formed in the blade body 112 define boundary regions 119 including thereon the steam-oxide finish 138 without any non-metallic coating 124 overlying the steam oxide finish. Each boundary region 138 defines a width "W" on the external surface of the cylindrical blade body. The width W of each boundary region 119 defining the steam tempered oxide finish 138 is such that the coating 124 is sufficiently spaced from the edges of the slots 118 so that when a lever or tool, e.g., a #2 screwdriver, is inserted into the slots 118 and levered against an edge of the respective slot, such as against one of the fulcrums 120A, 120B or 120C, the tool does not contact the coating 24 and thereby damage the coating. In the illustrated embodiment, the width W of each boundary region 119 is preferably within the range of about 0 inch to about ¼ inch.

The hole cutters of the present invention may include one or more features of the hole cutters disclosed and/or claimed in any of the following co-pending patent applications that are assigned to the assignee of the present invention and are hereby expressly incorporated by reference in their entireties as part of the present disclosure: the U.S. Patent Application filed on even date herewith, U.S. patent application No. 12/687,065, and entitled "Hole Cutter with Axially-Elongated Aperture Defining Multiple Fulcrums"; the U.S. Patent Application filed on even date herewith, U.S. patent application No. 12/687,073, and entitled "Hole Cutter With Minimum Tooth Pitch to Blade Body Thickness Ratio"; the U.S. Patent Application filed on even date herewith, U.S. patent application No. 12/687,102, and entitled "Hole Cutter With Extruded Cap"; the U.S. Patent Application filed on even date herewith, U.S. patent application No. 12/687,078, and entitled "Hole Cutter With Chip Egress Aperture"; the U.S. Design Patent Application filed on even date herewith, U.S. patent application No. 29/353,762, and entitled "Hole Saw"; and the U.S. Design Patent Application filed on even date herewith, U.S. patent application No. 29/353,759, and entitled "Hole Saw".

The term "coating" is used herein to mean a layer of substance or anything that is spread over or covers a surface, and including without limitation, an ink or paint. The term "metallic finish" is used herein to mean a surface or surface finish that consists of one or more metals, alloys or mixtures composed wholly or partly of one or more metals, and including without limitation, any of various forms of iron oxide, such as FeO, magnetite ($Fe_3O_4$), and hematite ($Fe_2O_3$), or simply a carbon steel and/or tool steel surface, such as a cutting edge surface, without any forms of iron oxide thereon. The term "metallic coating" is used herein to mean a coating that consists of one or more metals, alloys or mixtures composed wholly or partly of one or more metals, and including without limitation, physical vapor deposition ("PVD") coatings, such as titanium nitride ("TiN") coatings, aluminum titanium nitride ("AlTiN") coatings, and coatings that are combinations of AlTiN and TiN (e.g., an under layer of AlTiN and an over layer of TiN). The term PVD coating is used herein to mean any of a variety of vacuum deposition coatings and methods wherein thin films are deposited by the condensation of a vaporized form of the material onto various surfaces, and including without limitation evaporative deposition, electron beam physical vapor deposition, sputter deposition, cathodic arc deposition, and pulsed laser deposition coatings. The term "ink" is used herein to mean a fluid or viscous substance used for printing, and including without limitation, dyes, inks containing dyes (e.g., coloring molecules dissolved in a liquid), UV curable inks, other photo, light or radiation curable inks, heat or hot air drying inks, and solvent based inks. The term "paint" is used herein to mean a substance composed of solid coloring matter suspended in a liquid medium and applied as a protective or decorative coating to various surfaces. The term "chip" is used herein to mean small particles of a work piece formed upon cutting the work piece with the hole cutter, and including without limitation, saw dust, wood dust, wood chips, metal dust, metal chips, dust and/or chips created upon cutting work pieces formed of materials other than wood or metal, and/or including materials or components in addition to wood or metal.

It may be readily understood by those having skill in the pertinent art from the present disclosure that any of numerous changes and modifications may be made to the above-described and other embodiments of the present invention without departing from the scope of the invention as defined in the appended claims. For example, the hole cutters may be made from any of numerous different materials or combinations of materials, in any of numerous shapes, taking any of numerous different dimensions, that are currently known or that later become known. As an example, the cutting edge may take any form, pattern, arrangement or configuration that is currently known or that later becomes known, including without limitation tooth patterns that tend to function well in specific applications, hybrid applications or general applications. For example, the cutting teeth may define any of numerous different tooth forms, pitch patterns, and/or set patterns. As another example, a single aperture may be provided in the body of the hole cutter, two or more apertures may be angularly and/or axially aligned with one another, or two or more apertures may be variably spaced angularly and/or axially relative to one another. In addition, the hole cutters may define different numbers of axially-elongated apertures, different aperture configurations, shapes and/or sizes than those disclosed herein. Also, the hole cutters may be used in any of numerous different cutting applications, on any of numerous different work piece materials, such as woods, metals, plastics, composites, resins, stones, fabrics, foams, etc. Further, the blade body may not define any elongated apertures or slots, or the apertures or slots may not be contained within the side walls of the hole cutters. For example, the apertures may extend to the cutting edge, the top rim of the side wall or cap, or may extend to both the cutting edge and top rim of the side wall or cap to define a channel that extends the entire or substantially entire axial extent of the blade body. As another example, the non-metallic coating may be applied only to an external portion of the blade body, or conversely, to the entire external surface of the blade body. Similarly, the non-metallic coating may be applied to a portion of the exterior surface of the cap or to the entire exterior and/or interior surfaces of the cap. As another example, the non-metallic coating may be applied to only a portion of the blade body, and may not extend around the periphery of the blade body, or may not axially-extend relatively close to the cutting edge and/or non-working end. As another example, the non-metallic coating may not be applied by a rotary offset print process or apparatus, but instead may be applied by any other coating application process or apparatus. For example, the coating may be applied by a physical vapor deposition (PVD) process or apparatus. As yet another example, the steam oxide or other metallic finish may be applied to components of the cutter before the cutter is partially or fully assembled, and/or the coating applied to the blade body before the cutter is partially or fully assembled. For example, the cap and/or cutting edge may be steam tempered as separate components, the blade body may be coated as a separate component, and then the blade body, cutting edge and cap assembled into a cutter. As another example, the cutting edge and/or other components of the hole cutters may include a coating, as opposed to, or in addition to, the oxide finish. For example, the cutting edge may include a metallic coating, such as aluminum titanium nitride (AlTiN), applied by a PVD process or apparatus. As another example, the cutting edge may further include a gold colored coating, such as TiN, applied in lieu of or over an AlTiN or other PVD coating. In addition, the blade body and cap need not be formed by separate components that are welded to each other, but rather can be formed integral with each other, such as by casting, spinning, drawing, or other metal working processes that are currently known, or that later become known. Accordingly, this detailed description of the currently preferred embodiments of the present invention is to be taken in an illustrative, as opposed to a limiting sense.

What is claimed is:

1. A hole cutter defining an axis of rotation for cutting a work piece and generating chips upon cutting the work piece, comprising:

a substantially cylindrical blade body extending about the axis of rotation, a cap located at one end of the blade body, and a cutting edge located at an opposite end of the blade body relative to the cap, wherein the blade body defines a flat substantially cylindrical exterior surface extending from the one end of the blade body to the cutting edge and a substantially cylindrical interior surface, the cap defines exterior and interior surfaces, the cutting edge defines exterior and interior surfaces, and the interior surface of the blade body extends from the cap to the interior surface of the cutting edge, the blade body defines a heat resistant non-metallic coating defining a colored band disposed on and extending axially and annularly throughout a substantial portion of the flat exterior cylindrical surface of the blade body and axially spaced from the cutting edge a first distance, wherein the heat resistant non-metallic coating does not soften when subjected to frictional forces encountered by the flat exterior cylindrical surface during cutting, the flat exterior surface of the cutting edge defines a metallic finish forming a metallic band extending about the periphery of the blade body at the cutting edge, extending axially between the cutting edge and the heat resistant non-metallic colored coating band, and contrasting in color with the heat resistant non-metallic colored coating band, the interior surfaces of the cylindrical blade body and cutting edge define a metallic finish, and the metallic finish maintains the interfaces between the exterior and interior surfaces of the cutting edge, and the interior surface of the blade body, and a work piece, substantially free of any coating that softens and mixes with the chips generated upon cutting the work piece.

2. The hole cutter of claim 1, wherein the heat resistant non-metallic coating forms a substantially cylindrical band extending throughout a cylindrical portion of the blade body spaced a first distance relative to the cutting edge.

3. The hole cutter of claim 2, wherein the cylindrical heat resistant non-metallic coating band defines a substantially straight edge spaced the first distance relative to the cutting edge.

4. The hole cutter of claim 2, wherein the cutting edge is defined by a plurality of teeth defining tips and gullets extending between the tips, each gullet defines a depth, and the first distance is greater than the depth of the deepest gullet.

5. The hole cutter of claim 4, wherein the first distance is at least about 1/10 inch greater than the deepest gullet.

6. The hole cutter of claim 5, wherein the first distance is less than about 1/2 inch greater than the deepest gullet.

7. The hole cutter of claim 6, wherein the first distance is less than about 1/4 inch greater than the deepest gullet.

8. The hole cutter of claim 4, wherein the first distance is measured from either (i) a deepest gullet of the cutting edge, or (ii) a plane extending between tips of unset teeth.

9. The hole cutter of claim 2, wherein the heat resistant non-metallic coating extends throughout substantially the entire cylindrical band.

10. The hole cutter of claim 2, wherein the heat resistant non-metallic coating band is spaced inwardly from an axial end surface of the cap, and the cap defines a metallic finish.

11. The hole cutter of claim 10, wherein the heat resistant non-metallic coating band is spaced inwardly from the axial end surface of the cap a second distance that is approximately equal to the first distance.

12. The hole cutter of claim 1, wherein the metallic finish is a steam oxide finish.

13. The hole cutter of claim 1, wherein the metallic finish on the cutting edge is defined by a metallic coating.

14. The hole cutter of claim 13, wherein the metallic coating is a PVD coating.

15. The hole cutter of claim 14, wherein the PVD coating is at least one of titanium nitride, aluminum titanium nitride, and a combination of titanium nitride and aluminum titanium nitride.

16. The hole cutter of claim 1, wherein the heat resistant non-metallic coating band covers greater than about 75% of the flat external surface area of the flat cylindrical blade body.

17. The hole cutter of claim 16, wherein the heat resistant non-metallic coating band covers greater than about 90% of the flat external surface area of the flat cylindrical blade body.

18. The hole cutter of claim 1, wherein the heat resistant non-metallic coating comprises an ink or a paint.

19. The hole cutter of claim 18, wherein the heat resistant non-metallic coating comprises at least one of a dye, an ink containing dye, a photo, light or radiation curable ink, a heat or hot air drying ink, and a solvent based ink.

20. The hole cutter of claim 18, wherein the heat resistant non-metallic coating is a UV curable ink.

21. The hole cutter of claim 1, wherein the metallic finish is a steam tempered, dark-colored oxide finish.

22. The hole cutter of claim 21, wherein the oxide finish is a film of iron oxide.

23. The hole cutter of claim 1, wherein the heat resistant non-metallic coating covers at least a portion of the external surface of the cap.

24. The hole cutter of claim 1, wherein the heat resistant non-metallic coating band defines a label including thereon at least one of a trademark, logo, manufacturer identification or part number.

25. The hole cutter of claim 1, wherein the heat resistant non-metallic coating is softenable from heat generated during cutting with the hole cutter, and said first distance is sufficient so that the heat resistant non-metallic coating does not soften from heat generated during cutting with the hole cutter.

26. The hole cutter of claim 1, wherein the first distance is selected so that the coating does not interfere with at least one of (i) removal of a slug from an interior of the hole cutter; (ii) cutting efficiency of the hole cutter; and (iii) chip ejection from the hole cutter due to heat or friction generated between the blade body and the work piece during cutting.

27. The hole cutter of claim 1, wherein the heat resistant non-metallic coating includes a non-stick or friction-reducing property.

28. The hole cutter of claim 1, wherein the blade body has a wall thickness within the range of 0.032 inch to 0.038 inch.

29. A hole cutter defining an axis of rotation for cutting a work piece and generating chips upon cutting the work piece, comprising:
a substantially cylindrical blade body extending about the axis of rotation, a cap located at one end of the blade body, and
a cutting edge located at an opposite end of the blade body relative to the cap,
wherein the blade body defines a flat substantially cylindrical exterior surface extending from the one end of the blade body to the cutting edge and a substantially cylindrical interior surface, the cap defines exterior and interior surfaces, the cutting edge defines exterior and interior surfaces, and the interior surface of the blade body extends from the cap to the interior surface of the cutting edge,
the blade body defines a first heat resistant non-metallic means for decorating the hole cutter and for receiving thereon at least one of a trademark, logo, manufacturer identification or part number axially spaced from the cutting edge and extending axially and annularly throughout a substantial portion of the flat exterior cylindrical surface of the blade body wherein the heat resistant non-metallic means does not soften when subjected to frictional forces encountered by the flat exterior cylindrical surface during cutting, and
a second metallic means contrasting in color with the first heat resistant non-metallic means, extending about the periphery of the blade body at the exterior and interior surfaces of the cutting edge, extending axially between the cutting edge and the first heat resistant non-metallic means, and extending axially and annularly throughout a substantial portion of the interior cylindrical surface of the blade body, for maintaining the interfaces between the exterior and interior surfaces of the cutting edge, and the interior surface of the blade body, and a work piece, substantially free of any coating that softens and mixes with the chips generated upon cutting the work piece.

30. The hole cutter of claim 29, wherein the first heat resistant non-metallic means is a non-metallic coating and the second metallic means is a metallic finish.

31. The hole cutter of claim 30, wherein the non-metallic coating is a UV curable ink, and the metallic finish is a steam tempered, iron oxide finish.

32. The hole cutter of claim 29, wherein the first heat resistant non-metallic means is softenable from heat generated during cutting with the hole cutter, and is sufficiently axially spaced from the cutting edge so that the first heat resistant non-metallic means does not soften from heat generated during cutting with the hole cutter.

33. The hole cutter of claim 29, wherein the blade body has a wall thickness within the range of 0.032 inch to 0.038 inch.

* * * * *